(12) United States Patent
Punjani et al.

(10) Patent No.: US 11,512,627 B2
(45) Date of Patent: *Nov. 29, 2022

(54) ELECTRIFIED AIR SYSTEM FOR REMOVING COLD START AIDS

(71) Applicant: Deere & Company, Moline, IL (US)

(72) Inventors: Pratir Punjani, Waterloo, IA (US); Joseph R. Gonsowski, Buckingham, IA (US); Brian Bratvold, New Hartford, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,121

(22) Filed: Aug. 12, 2021

(65) Prior Publication Data

US 2021/0372319 A1 Dec. 2, 2021

Related U.S. Application Data

(63) Continuation of application No. 16/533,405, filed on Aug. 6, 2019, now Pat. No. 11,143,097.

(Continued)

(51) Int. Cl.
*F02B 39/16* (2006.01)
*F02B 39/10* (2006.01)
(Continued)

(52) U.S. Cl.
CPC .............. *F02B 39/16* (2013.01); *F01N 5/04* (2013.01); *F02B 33/40* (2013.01); *F02B 37/005* (2013.01);
(Continued)

(58) Field of Classification Search
CPC ........ F02B 39/16; F02B 33/40; F02B 37/005; F02B 37/10; F02B 37/12; F02B 39/10; F02B 2037/122; F02B 2039/164; F02B 2039/168; F01N 5/04; F01N 9/00; F01N 2560/06; F01N 2560/14; F01N 2900/1404; F01N 2900/1406; F01N 2900/1411; F01N 13/008; F01N 13/10; F01N 3/10;
(Continued)

(56) References Cited

U.S. PATENT DOCUMENTS 1,800,780 A 4/1931 Hurtley
2,634,782 A 4/1953 Turek et al.
(Continued)

*Primary Examiner* — Hoang M Nguyen
(74) *Attorney, Agent, or Firm* — Michael Best & Friedrich LLP

(57) ABSTRACT

An intake system for use with an internal combustion engine having one or more cylinders. The intake system including a compressor assembly having an inlet and an outlet, and where the outlet is configured to be open to and in fluid communication with at least one of the one or more cylinders. The intake system also includes a passageway extending between and in fluid communication with the inlet and the outlet and configured to direct a first flow of gasses and a controller in operable communication with the compressor assembly. Where the intake system is operable in a first mode in which the majority of gasses of the first flow of gasses flow through the passageway toward the outlet, and a second mode in which the majority of gasses of the first flow of gasses flow through the passageway toward the inlet.

15 Claims, 11 Drawing Sheets

Related U.S. Application Data

(60) Provisional application No. 62/773,137, filed on Nov. 29, 2018.

(51) Int. Cl.

| | | |
|---|---|---|
| *F02D 41/00* | (2006.01) | |
| *F02B 37/10* | (2006.01) | |
| *F02D 41/06* | (2006.01) | |
| *F01N 5/04* | (2006.01) | |
| *F02B 33/40* | (2006.01) | |
| *F02B 37/00* | (2006.01) | |
| *F02B 37/12* | (2006.01) | |
| *F02D 29/06* | (2006.01) | |
| *F02D 35/02* | (2006.01) | |
| *F02D 41/14* | (2006.01) | |
| *F02D 41/22* | (2006.01) | |

(52) U.S. Cl.
CPC ............ *F02B 37/10* (2013.01); *F02B 37/12* (2013.01); *F02B 39/10* (2013.01); *F02D 29/06* (2013.01); *F02D 35/023* (2013.01); *F02D 41/0007* (2013.01); *F02D 41/064* (2013.01); *F02D 41/1446* (2013.01); *F02D 41/22* (2013.01); *F02B 2037/122* (2013.01); *F02B 2039/164* (2013.01); *F02B 2039/168* (2013.01); *F02D 2200/0406* (2013.01); *F02D 2200/0414* (2013.01)

(58) Field of Classification Search
CPC .... F02D 29/06; F02D 35/023; F02D 41/0007; F02D 41/064; F02D 41/1446; F02D 41/22; F02D 2200/0406; F02D 2200/0414; F02D 41/1454; F02D 2200/702; F02D 2250/24; Y02T 10/12
USPC ...... 60/600, 601, 605.1–612; 123/559.1, 564
See application file for complete search history.

(56) References Cited

U.S. PATENT DOCUMENTS

| | | |
|---|---|---|
| 4,418,737 A | 12/1983 | Goodell et al. |
| 4,622,817 A | 11/1986 | Kobayashi |
| 4,745,754 A | 5/1988 | Kawamura |
| 4,745,755 A | 5/1988 | Kawamura |
| 4,817,387 A | 4/1989 | Lashbrook |
| 6,557,347 B1 | 5/2003 | Mvarez et al. |
| 6,568,173 B1 | 5/2003 | Kolmanovsky et al. |
| 6,871,498 B1 | 3/2005 | Allen et al. |
| 7,178,327 B2 | 2/2007 | Miyashita |
| 10,926,588 B2 | 2/2021 | Fiorati et al. |
| 10,982,591 B2 * | 4/2021 | Punjani .................. F02D 35/023 |
| 11,143,097 B2 * | 10/2021 | Punjani ................... F02D 29/06 |
| 2002/0116925 A1 | 8/2002 | Hampson et al. |
| 2002/0121323 A1 | 9/2002 | Tarasinski |
| 2005/0155348 A1 | 7/2005 | Inoue |
| 2007/0144171 A1 | 6/2007 | Tarasinski et al. |
| 2008/0121218 A1 | 5/2008 | Algrain |
| 2009/0198432 A1 | 8/2009 | Tabata et al. |
| 2010/0107632 A1 | 5/2010 | Wu et al. |
| 2010/0263639 A1 | 10/2010 | Uhrich et al. |
| 2011/0222289 A1 | 9/2011 | Yamamoto et al. |
| 2012/0297767 A1 | 11/2012 | Hofbauer |
| 2013/0298554 A1 | 11/2013 | Sellnau |
| 2013/0340429 A1 | 12/2013 | Desai et al. |
| 2014/0090374 A1 | 4/2014 | Chavannavar |
| 2014/0144412 A1 | 5/2014 | An et al. |
| 2014/0230430 A1 | 8/2014 | Krug et al. |
| 2015/0007563 A1 | 1/2015 | Wade |
| 2016/0061102 A1 | 3/2016 | Sugiyama |
| 2016/0237931 A1 | 8/2016 | Pappenheimer et al. |
| 2017/0184038 A1 | 6/2017 | Garrard et al. |
| 2018/0112633 A1 | 4/2018 | Keating et al. |
| 2018/0223751 A1 | 8/2018 | Xiao et al. |
| 2018/0236827 A1 | 8/2018 | Breneman |
| 2018/0297422 A1 | 10/2018 | Ciovnicu et al. |
| 2019/0070907 A1 | 3/2019 | Dudar et al. |
| 2020/0165990 A1 | 5/2020 | Heinisch et al. |
| 2020/0173354 A1 | 6/2020 | Punjani et al. |

\* cited by examiner

ELECTRIFIED AIR SYSTEM FOR REMOVING COLD START AIDS

CROSS-REFERENCE TO RELATED APPLICATIONS

This patent application is a continuation of U.S. patent application Ser. No. 16/533,405, filed Aug. 6, 2019 which in turn is a formalization of Provisional Patent Application No. 62/773,137 filed Nov. 29, 2018. Both references are hereby incorporated by reference.

FIELD OF THE INVENTION

The present disclosure relates to a power unit having an electrified air system and controller configured to enact various protection modes to compensate for cold-start conditions.

BACKGROUND

Conventional engines use engine de-rating (e.g., limiting the amount of fuel injected into the cylinders during operation) to avoid operating conditions approaching the engine's design limits.

SUMMARY

In one aspect, an intake system for use with an internal combustion engine having at least one cylinder, the intake system including a compressor assembly having a compressor housing and a compressor wheel movable with respect to the compressor housing, where the compressor housing includes a compressor inlet and a compressor outlet, and where the compressor assembly is operable in an activated configuration in which the compressor wheel is driven relative to the compressor housing, and a deactivated configuration in which the compressor wheel is not driven relative to the compressor housing, a passageway having a first end open to and in fluid communication with the inlet of the compressor assembly and a second end open to and in fluid communication with the outlet of the compressor assembly, a valve at least partially positioned within the passageway and adjustable between an open configuration, in which the first end is in fluid communication with the second end via the passageway, and a closed configuration, in which the first end is not in fluid communication with the second end via the passageway, and a controller in operable communication with the compressor assembly and the valve, where the controller is operable in a first mode in which the compressor assembly is in the activated configuration and the valve is in the open configuration.

In another aspect, an intake system for use with an internal combustion engine having one or more cylinders, the intake system including a compressor assembly having an inlet and an outlet, and where the outlet is configured to be open to and in fluid communication with at least one of the one or more cylinders, a passageway extending between and in fluid communication with the inlet and the outlet, and where the intake system is operable in a first mode in which the majority of gasses flow through the passageway in a first direction toward the outlet, and a second mode in which the majority of gasses flow through the passageway in a second direction opposite the first direction and toward the inlet.

In another aspect, an internal combustion engine including a block, a head coupled to the block to at least partially define a cylinder therebetween, and a compressor assembly having an inlet and an outlet in fluid communication with the cylinder, where the compressor is operable in a first mode in which a first portion of the gasses exiting the outlet are directed to the cylinder and a second portion of the gasses exiting the outlet is recirculated back to the inlet.

In another aspect, an intake system for use with an internal combustion engine having one or more cylinders, the intake system including a compressor assembly having an inlet and an outlet, and where the outlet is configured to be open to and in fluid communication with at least one of the one or more cylinders. The intake system also including a passageway extending between and in fluid communication with the inlet and the outlet and configured to direct a first flow of gasses, and a controller in operable communication with the compressor assembly, where the intake system is operable in a first mode in which the majority of gasses of the first flow of gasses flow through the passageway toward the outlet, and a second mode in which the majority of gasses of the first flow of gasses flow through the passageway toward the inlet.

In another aspect, an intake system for use with an internal combustion engine having one or more cylinders, the intake system including a compressor assembly having an inlet and an outlet, and where the outlet is configured to be in fluid communication with at least one of the one or more cylinders, where the compressor is adjustable between an activated configuration and a deactivated configuration. The intake system also includes a passageway extending between and in fluid communication with the inlet and the outlet, a valve in operable communication with the passageway, where the valve is adjustable between an open configuration in which gasses may flow through the passageway, and a closed configuration in which gasses cannot flow through the passageway. The intake system also includes a controller in operable communication with the compressor assembly, the valve, and the internal combustion engine, where the controller is configured to detect when a cold-start condition exists, and where the controller is configured to output signals to the valve and the compressor assembly so that the valve is in an open configuration and the compressor assembly in an activated configuration in response to the detection of a cold-start condition is detected.

In another aspect, an intake system for use with an internal combustion engine having one or more cylinders, the intake system including a compressor assembly having an inlet and an outlet, and where the outlet is configured to be in fluid communication with at least one of the one or more cylinders, where the compressor is adjustable between an activated configuration in which a first flow of gasses is discharged from the outlet and a deactivated configuration, and a controller in operable communication with the compressor assembly and the valve and the internal combustion engine, where the intake system is operable in a boosted configuration, in which the first flow of gasses is directed to the at least one of the one or more cylinders of the internal combustion engine, a non-boosted configuration, in which the compressor assembly is in the deactivated configuration, and a recirculation configuration, in which the first flow of gasses is directed toward the at least one of the one or more cylinders of the internal combustion engine and to the inlet of the compressor assembly.

In another aspect, an intake system for use with an internal combustion engine having one or more cylinders, the intake system including a compressor assembly having an inlet and an outlet, and where the outlet is configured to be in fluid communication with at least one of the one or more cylinders, where the compressor is adjustable between an activated configuration and a deactivated configuration, a passageway extending between and in fluid communication with the inlet and the outlet, the passageway having a first end proximate the inlet and a second end proximate the outlet, and a valve in operable communication with the passageway, where the valve is adjustable between an open configuration in which gasses may flow through the passageway, and a closed configuration in which gasses cannot flow through the passageway, and where the valve is configured to adjust from the closed configuration to the open configuration in response to a pressure differential across the valve exceeding a predetermine minimum value.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure generally relates to a controller for use with a power unit having an electrified air system. More specifically, the disclosure generally relates to a controller configured to monitor and record the operating conditions of the engine, intake system, exhaust system, and the like, and utilizes the collected data to determine when a hazard condition exists. The controller then outputs signals to the electrified air system component (e.g., an electrically powered compressor or an electrically assisted turbocharger) to enact non-derating countermeasures to eliminate the hazard condition without de-rating the engine itself (e.g., reducing the overall power output by the power unit). For the purposes of this application, a hazard condition includes any operating condition where the elements of the power unit are proximate to or at their corresponding design limits. In other embodiments, a hazard condition may also include conditions are proximate to or at their corresponding emissions or thermal limits.

By utilizing the electrified air system components, the power unit is able to operate closer to its operating limitations while minimizing the risk of causing undue damage to the power unit itself. The controller and electrified air system components can also be used to harness electrical energy from the power unit that can later be used to supplement the output of the internal combustion engine and compensate for any loss in power a particular countermeasure may cause (described below). Still further, the electrified air system can be used to assist in cold-start situations by re-circulating the intake airflow through one of an electrified compressor or electrified turbocharger to warm the airflow when a cold-start situation is detected. The recirculating capabilities of the electrified air system can also be used to keep the compressor of the electrified air system on the compressor map, avoiding stalling if airflow into the engine drops too low.

Figure 1:
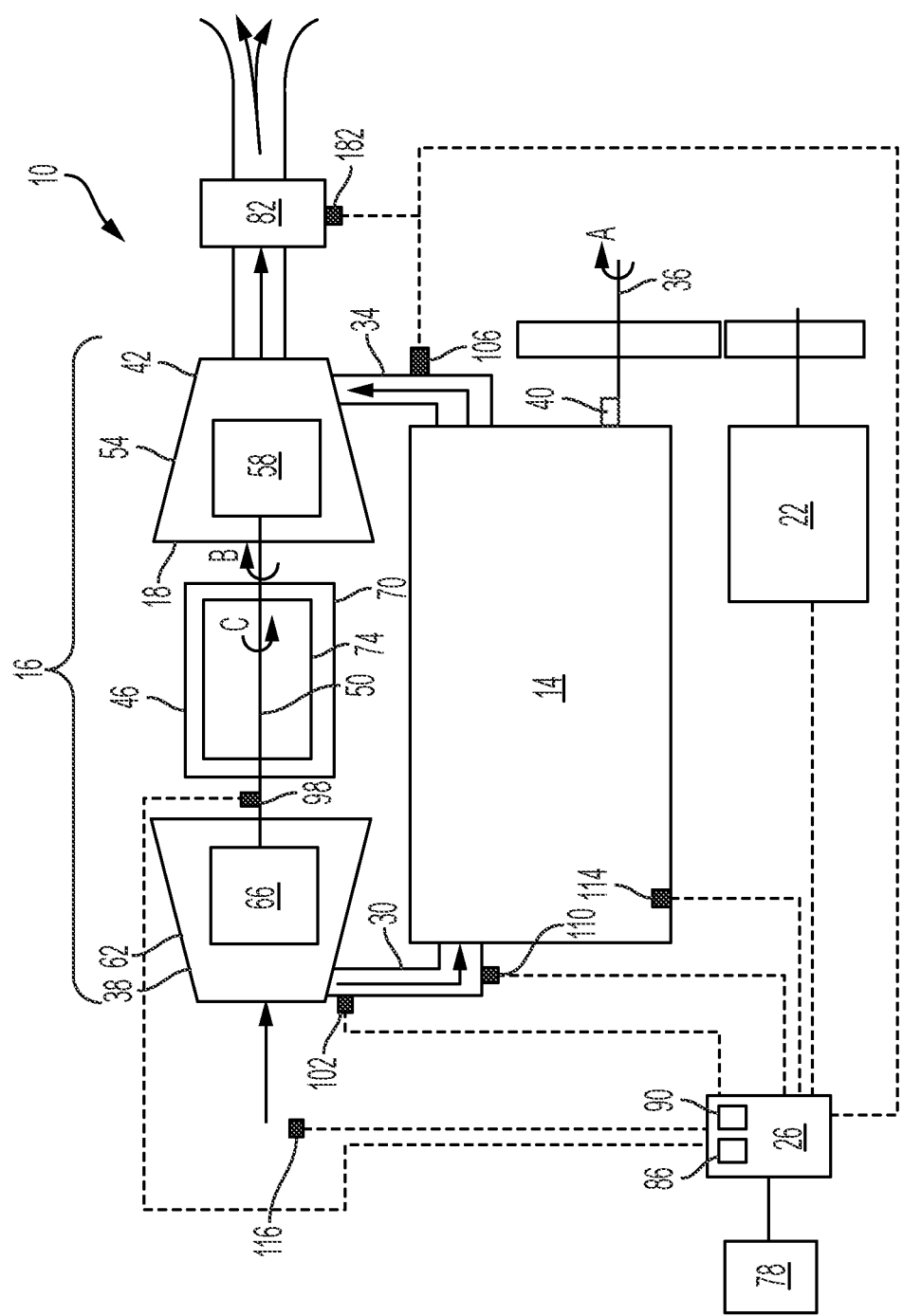
FIG. 1 is a schematic view of a power unit having an electrified air system including a turbocharger.

Referring to FIG. 1, a power unit 10 includes an internal combustion engine (ICE) 14, an electrified air system (EAS) 16 in operable communication with the ICE 14, a supplemental power unit 22 (e.g., a starter/generator) in operable communication with the EAS 16 and the ICE 14, and a controller 26. The ICE 14 of the power unit 10, in turn, includes one or more cylinders (not shown), an intake manifold 30 in operable communication with the cylinders, an exhaust manifold 34 in operable communication with the cylinders, a crank shaft 36 as is well known in the art, and a starter motor 40 to aid in starting the ICE 14 (e.g., by rotating the crank shaft 36). During use, air is directed into the ICE 14 via the intake manifold 30, the ICE 14 uses the air to rotate the crank shaft 36 in a first direction A via combustion, and then the ICE 14 expels heated exhaust gasses into the exhaust manifold 34.

Illustrated in FIG. 1, the EAS 16 includes an electrically assisted turbocharger 18 having a compressor assembly 38, a turbine assembly 42, a motor-generator unit 46, and a shaft 50 operably connecting the compressor assembly 38, the turbine assembly 42, and the motor-generator unit 46. In alternative implementations, the EAS 16 may also include an electrically assisted compressor assembly 20' (described below, see FIG. 8).

The turbine assembly 42 of the turbocharger 18 includes a turbine housing 54 and a turbine wheel 58 positioned within and rotatable with respect to the turbine housing 54. The turbine wheel 58, in turn, is coupled to and supported by the shaft 50 such that the two elements rotate together as a unit. During use, the turbine assembly 42 receives heated exhaust gases from the exhaust manifold 34 of the ICE 14 which pass over blades of the turbine wheel 58 resulting in a torque and rotational speed of shaft 50 driving compressor wheel 66 in rotational direction B. The torque generated by the turbine wheel 58 is generally proportional to the exhaust gas flow rate (EGFR) flowing through the turbine housing 54 at any given period of time. The EGFR, in turn, is generally dependent upon the operating conditions of the ICE 14 (e.g., the crank shaft speed, engine load, and/or throttle position). As such, the higher the EGFR, the greater the torque applied to the shaft 50 by the turbine wheel 58 and the faster the shaft assembly (e.g., the shaft 50, the compressor wheel 66, and the rotor 74) rotates.

The compressor assembly 38 of the turbocharger 18 includes a compressor housing 62 and a compressor wheel 66 positioned within and rotatable with respect to the compressor housing 62. The compressor wheel 66 in turn is coupled to and supported by the shaft 50 such that the compressor wheel 66 and the shaft 50 rotate together as a unit. As the compressor wheel 66 rotates relative to the compressor housing 62, the compressor wheel 66 draws ambient air into the compressor housing 62, compresses the air, and directs the resulting compressed air into the intake manifold 30. At a fixed engine speed, the flow rate and pressure at which air is directed into the intake manifold 30 is generally proportional to the speed at which the compressor wheel 66 is rotating relative to the compressor housing 62. As such, the faster the compressor wheel 66 rotates relative to the compressor housing 62, the greater the air flow and air pressure directed into the intake manifold 30.

The motor or motor-generator unit 46 of the turbocharger 18 includes a stator 70, and a rotor 74 rotatable with respect to the stator 70. The rotor 74 is coupled to and supported by the shaft 50 such that the rotor 74 and the shaft 50 rotate together as a unit. In the illustrated implementation, the motor 46 is operable in a free-wheel mode, a drive mode, and a generator mode. In the free-wheel mode, the rotor 74 rotates freely relative to the stator 70 exerting little to no torque on the shaft 50. In the drive mode, the motor 46 receives electrical energy from the controller 26 (discussed below) and uses the energy to physically drive the rotor 74 relative to the stator 70 causing the motor 46 to apply torque to the shaft 50 in the first rotational direction B. While operating in the drive mode, the magnitude of torque applied by the motor 46 to the shaft 50 can be adjusted via the controller 26. In the generator mode, the motor 46 acts as a generator receiving input torque from the shaft 50 and outputting electrical energy. More specifically, during the generator mode the shaft 50 drives the rotor 74 relative to the stator 70 (e.g., the motor 46 resists the rotation of the shaft 50 placing a load thereon) causing the motor 46 to generate electrical energy that is output to an energy storage device 78 or the supplemental power unit 22 by the controller 26. While operating in the generator mode, the magnitude of the resistance applied to the shaft 50 can be adjusted via the controller 26.

During use, the electrically assisted turbocharger 18 is operable in a first or default configuration 1000, a second or power assist configuration 1004, and a power harvesting configuration 1008. While operating in the first or default configuration 1000, the motor 46 is placed in the free-wheel mode and the turbine assembly 42 drives the compressor assembly 38 via the shaft 50. More specifically, the turbine assembly 42 receives heated exhaust gases from the exhaust manifold 34 causing the turbine assembly 42 to apply torque to the shaft 50 in the first direction B at a magnitude generally corresponding to the EGFR (described above). The shaft 50, in turn, drives the compressor wheel 66 relative to the compressor housing 62 causing the compressor assembly 38 to output compressed air to the intake manifold 30 as described above. During the first mode of operation 1000, the motor 46 remains in the free-wheel mode (described above) and therefore does not assist or restrict the rotation of the shaft 50.

While operating in the power assist configuration 1004, the motor 46 is placed in the drive mode causing the turbine assembly 42 and motor 46 both drive the compressor assembly 38 via the shaft 50. More specifically, the turbine assembly 42 receives heated exhaust gases from the exhaust manifold 34 causing the turbine assembly 42 to apply torque to the shaft 50 in the first direction B at a magnitude generally corresponding to the EGFR (described above). Concurrently, electrical energy is directed to the motor 46 by the controller 26 causing the motor 46 to also apply torque to the shaft 50 in the first direction B at a magnitude dictated by the controller 26. By doing so, the torque applied to the shaft 50 by the motor 46 supplements the torque produced by the turbine assembly 42 causing the shaft 50 and the compressor wheel 66 to rotate faster and output more compressed air than would normally be possible for a given EGFR. Stated differently, in the power assist configuration 1004 the motor 46 is used to speed up or accelerate the rotation of the shaft 50 in the first direction B.

While operating in the third or power harvesting configuration 1008, the motor 46 is placed in the generator mode causing the turbine assembly 42 to drive both the compressor assembly 38 and the motor 46 via the shaft 50. More specifically, the turbine assembly 42 receives heated exhaust gases from the exhaust manifold 34 causing the turbine assembly 42 to apply torque to the shaft 50 in the first direction B at a magnitude generally corresponding to the EGFR. The shaft 50, in turn, drives both the compressor wheel 66 and the rotor 74 causing the compressor assembly 38 to output compressed air to the intake manifold 30 and the motor 46 to generate electrical energy. Furthermore, operation of the motor 46 in the generator mode causes the motor 46 to resist the rotation of the shaft 50 (e.g., exerting a torque against the shaft 50 in a second rotational direction C opposite the first rotational direction B). As such, the motor 46 produces a braking effect causing the shaft 50 to rotate at a slower speed than would normally be expected for a given EGFR. In the illustrated implementation, the level of resistance applied to the shaft 50 by the motor 46 can be adjusted by the controller 26. Stated differently, in the power harvesting configuration 1008 the motor 46 is used to slow down or decelerate the rotation of the shaft 50 in the first direction B.

Illustrated in FIG. 1, the supplemental power unit 22 of the power unit 10 includes an electrical motor in operable communication with the ICE 14 and configured to selectively apply torque to the crank shaft 36 thereof. During use, the supplemental power unit 22 is operable in a drive configuration, in which electrical energy is directed to the power unit 10 by the controller 26 (e.g., from the energy storage device 78) causing the supplemental power unit 22 to apply torque to the crank shaft 36 in the first direction A and supplement the power produced by the ICE 14.

The power unit 10 also includes an exhaust aftertreatment system (EATS) 82 positioned downstream of the turbocharger 18 and configured to treat the exhaust gasses of the power unit 10. More specifically, the EATS 82 is positioned downstream of the turbine assembly 42 and is configured to receive the exhaust gasses therefrom, treat the exhaust gasses, and output the treated gasses into the surrounding atmosphere.

Illustrated in FIG. 1, the controller 26 includes a processor 86, a memory unit 90 in operable communication with the processor 86, one or more sensors sending and receiving signals with the processor 86. The processor 86 is also in operable communication with various elements of the power unit 10 including, but not limited to, the ICE 14, the EAS 16, the supplemental power unit 22, the energy storage device 78, and the exhaust aftertreatment system 82. During use, the processor 86 is configured to receive signals from the one or more sensors, input the received information into one or more predetermined control algorithms to determine when a hazard condition exists (e.g., when an operating condition is approaching its design limits), and output signals to the EAS 16, the supplemental power unit 22, and/or the energy storage device 78 to minimize or eliminate any potentially damaging attributes without de-rating the overall output of the power unit 10 (e.g., substantially maintaining the overall output of the power unit 10).

In the illustrated implementation, the controller 26 includes a turbocharger speed sensor 98, a compressor out temperature sensor 102, an exhaust manifold temperature sensor 106, an air/fuel ratio sensor 110, a cylinder pressure sensor 114, and an ambient pressure sensor 116. Although not illustrated, the controller 26 may also include additional sensors such as, but not limited to, an exhaust flow sensor, an exhaust manifold pressure sensor, an intake manifold pressure sensor, an intake manifold flow sensor, a crankshaft speed sensor, a throttle position sensor, a compressor inlet sensor, a fuel injector flow sensor, an exhaust gas recirculation flow sensor, and the like. While the sensors of the illustrated implementation are electronic in nature, it is to be understood that in alternative implementations the controller 26 and sensors may be mechanical in nature or be virtually modeled based at least in part on other sensor readings.

The turbocharger speed sensor 98 includes a sensor configured to output a signal corresponding to the real-time rotational speed and direction of the shaft 50 of the turbocharger 18 (e.g., the shaft speed 118). In some implementations, the turbocharger speed sensor 98 may include a sensor being directly connected to or in operable communication with the shaft 50. However, in alternative implementations, the real-time shaft speed 118 may be calculated by the controller 26 at least partially dependent upon the exhaust flow rate, exhaust manifold pressure, and the intake manifold pressure. In still other implementations, the rotational speed of the shaft 50 may be calculated using turbocharger maps if the turbine inlet and outlet conditions are known (e.g., the conditions of exhaust flowing into and out of the turbine assembly 42).

The compressor out temperature sensor 102 includes a sensor configured to output a signal corresponding to the temperature of the compressed air being exhausted by the compressor assembly 38 of the turbocharger 18 (e.g., the compressor out temperature 122). In some implementations, the compressor out temperature sensor 102 may include a thermocouple positioned within the flow of compressed air exhausted by the compressor assembly 38. However, in alternative implementations, the compressor out temperature 122 may be calculated by the controller 26 based at least in part on the compressor air inlet conditions, the compressor air outlet conditions, the intake air flow rate, and the turbocharger rotational speed.

The exhaust manifold temperature sensor 106 includes a sensor configured to output a signal corresponding to the temperature of the gasses flowing through the exhaust manifold 34 (e.g., the exhaust temperature 126). In some implementations, the exhaust manifold temperature sensor 106 may include a thermocouple positioned within the flow of gasses passing through the exhaust manifold 34. However, in alternative implementations, the exhaust temperature 126 can be calculated by the controller 26 based at least in part on the intake air flow, the air/fuel ratio, the exhaust flow, and the exhaust manifold pressure.

The air/fuel sensor 110 includes a sensor configured to output a signal corresponding to the ratio of air to fuel within the cylinders of the ICE 14 (e.g., the air/fuel ratio 130). In some implementations, the air/fuel sensor 110 can include a detector positioned within the intake manifold 30 of the ICE 14. However, in alternative implementations, the air/fuel ratio 130 can be calculated by the controller 26 based at least in part on the injected fuel mass, the exhaust gas recirculation flow rate, a combustion products calculation, and the flow of fresh air entering the ICE 14.

The cylinder pressure sensor 114 is configured to output a signal corresponding to the pressure of the gasses within the cylinders of the ICE 14 (e.g., the cylinder pressure 134). In some implementations, the cylinder pressure sensor 114 may include a pressure sensor in fluid communication with at least one cylinder of the ICE 14. However, in alternative implementations, the cylinder pressure 134 may be calculated by the controller 26 based at least in part on the intake manifold pressure, the intake air flow rate, and the injected fuel mass.

The ambient air pressure sensor 116 is configured to output a signal corresponding to the ambient air pressure in the atmosphere surrounding the power unit 10 (e.g., outside the ICE 14). In other implementations, the ambient air pressure sensor 116 may be used to determine the elevation at which the power unit 10 is operating. In still other implementations, the ambient air pressure sensor 116 may include or work together with a GPS system to determine elevation directly (e.g., via ground models and location data).

Figure 2:
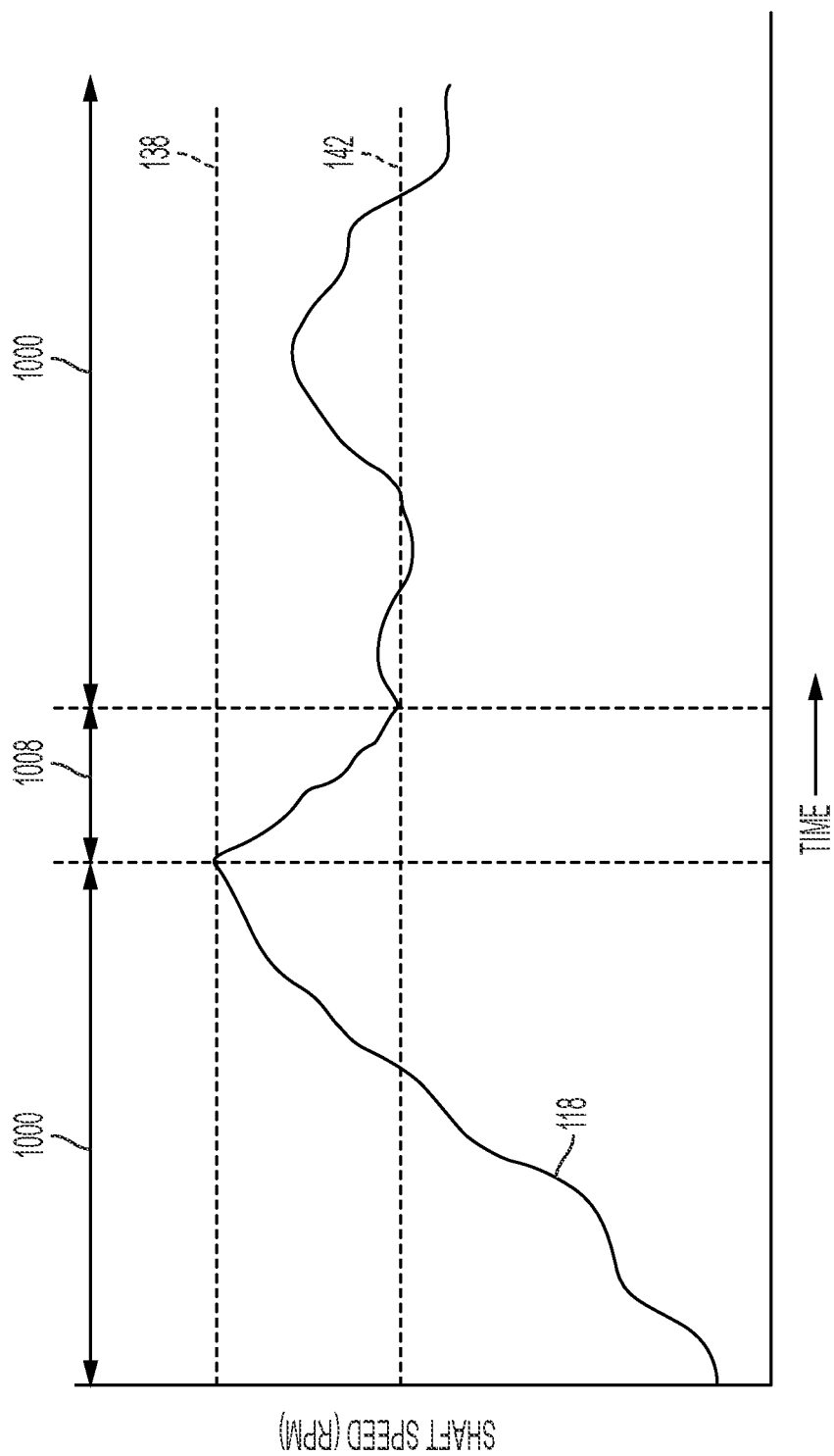
FIGS. 2-7 illustrate various operating conditions of the power unit.

In some implementations, the processor 86 of the controller 26 is configured to monitor the real-time shaft speed 118 of the turbocharger shaft 50 and adjust the operating conditions of the power unit 10 when a potential turbocharger over-speed condition is detected. To do so, the processor 86 receives a constant stream of data from the turbocharger speed sensor 98 indicating the real-time shaft speed 118 of the shaft 50. The processor 86 then compares the real-time shaft speed 118 to a pre-determined maximum rotational limit 138. If the real-time shaft speed 118 is less than the maximum rotational limit 138, the processor 86 is configured to permit the turbocharger 18 to continue operating in the default configuration 1000 (see FIG. 2). However, if the detected real-time shaft speed 118 is greater than or equal to the maximum rotational limit 138, a hazard condition exists and the processor 86 is configured enact a non-derating countermeasure to slow the shaft 50 and avoid potentially dangerous operating conditions. As discussed above, a non-derating countermeasure is a countermeasure configured to alter or limit the potentially dangerous operating conditions without reducing the power output of the overall power unit 10.

In the illustrated implementation, the processor 86 enacts a non-derating countermeasure in response to the hazard condition by switching the turbocharger 18 into the power harvesting configuration 1008. To do so, the processor 86 sends signals to the motor 46 instructing the motor 46 to change into the generator mode (described above). Once in the generator mode, the motor 46 resists the rotation of the shaft 50 thereby reducing the shaft speed 118. In the present implementation, the magnitude of the resisting force exerted by the motor 46 onto the shaft 50 may be actively adjusted by the processor 86. As such, the processor 86 is able to actively control the shaft speed 118.

In addition to reducing the shaft speed 118, the motor 46 also produces electrical energy, as described above. The generated energy, in turn, is directed to the supplemental power unit 22 by the processor 86 causing the supplemental power unit 22 to exert supplemental torque to the crank shaft 36 of the ICE 14 in the first direction A. As such, any reduction in ICE 14 output that may result from the slower shaft speed 118 of the turbocharger 18 (e.g., less boost provided to the ICE 14) can at least be at least partially compensated for by the output of the supplemental power unit 22. Furthermore, the electrical energy generated by the motor 46 minimizes any energy draw from the energy storage device 78. In all, the reduced shaft speed 118 and supplemental torque allow the power unit 10 to substantially maintain its overall power output (e.g., the ICE 14 and supplemental power unit 22 together) while removing the potentially damaging turbocharger over speed hazard condition.

Once the real-time shaft speed 118 falls below a pre-determined rotation activation limit 142, the processor 86 is configured to return the turbocharger 18 to its initial operating conditions (e.g., the default configuration, described above). By doing so the motor 46 is returned to the free wheel mode of operation 1000, removing the resistance from the shaft 50. The supplemental power unit 22 may also stop applying torque to the crank shaft 36 once the power output of the ICE 14 returns to its anticipated level. In the illustrated implementation, the rotation activation limit 142 is less than the maximum rotational limit 138 (see FIG. 2); however in alternative implementations, the rotation activation limit 142 and the maximum rotation limit 138 may be the same.

Figure 3:
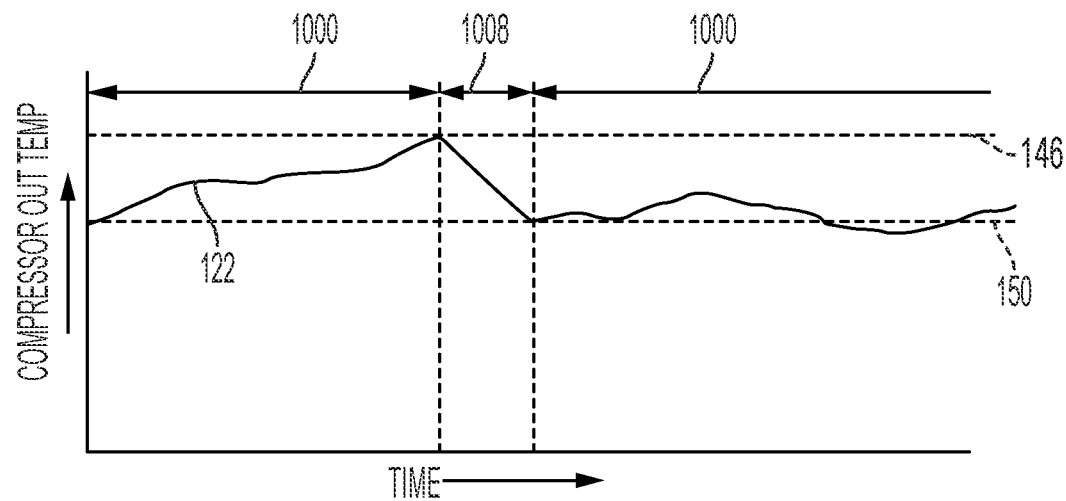

In other implementations, the processor 86 of the controller 26 is configured to monitor the real-time compressor out temperature 122 and adjust the operating conditions of the power unit 10 when the compressor out temperature 122 exceeds a predetermined limit (see FIG. 3). To do so, the processor 86 receives a constant stream of data from the compressor out temperature sensor 102 indicating the real-time compressor out temperature 122. The processor 86 then compares the compressor out temperature 122 to a pre-determined maximum compressor temperature limit 146. If the detected compressor out temperature 122 is less than the maximum compressor temperature limit 146 the processor 86 is configured to permit the turbocharger 18 to continue to operate as is (e.g., in the default mode). However, if the detected real-time compressor out temperature 122 is greater than the maximum compressor temperature 146, a hazard condition exists and the processor 86 is configured to enact a non-derating countermeasure to reduce the compressor out temperature 122.

In the illustrated implementation, the processor 86 enacts a non-derating countermeasure by switching the turbocharger 18 into the power harvesting configuration. To do so, the processor 86 sends signals to the motor 46 causing the motor 46 to change into the generator mode (described above). By doing so, the motor 46 begins to resist the rotation of the shaft 50 by placing a load thereon. Once in the generator mode, the motor 46 resists the rotation of the shaft 50 thereby reducing the shaft speed 118 and, as a corollary, slowing the compressor wheel 66 of the compressor assembly 38 and reducing the compressor out temperature 122. Depending on the specific control algorithms present, the magnitude of the resisting force exerted by the motor 46 onto the shaft 50 may be actively adjusted allowing the processor 86 to actively adjust the speed at which the shaft 50 decelerates and the rate at which the compressor out temperature 122 is reduced.

In addition to reducing the compressor out temperature 122, the motor 46 also produces electrical energy driving the supplemental power unit 22 to compensate for any reduced output from the ICE 14 as described above. In all, the reduced compressor out temperature 122 and supplemental torque allow the power unit 10 to substantially maintain its overall power output while removing the potentially damaging compressor output temperature hazard condition.

Once the real-time compressor out temperature 122 falls below a pre-determined compressor temperature activation limit 150, the processor 86 is configured to return the turbocharger 18 to its initial operating condition (e.g., the default configuration, described above). By doing so the motor 46 returns to the free wheel mode of operation, removing the load from the shaft 50. The supplemental power unit 22 may also stop applying torque to the crank shaft 36 once the power output of the ICE 14 returns to its anticipated level. In the illustrated implementation, the compressor temperature activation limit 150 is less than the maximum temperature limit 146 (see FIG. 3); however in alternative implementations, the activation limit 150 and the maximum temperature limit 146 may the same.

Figure 4:
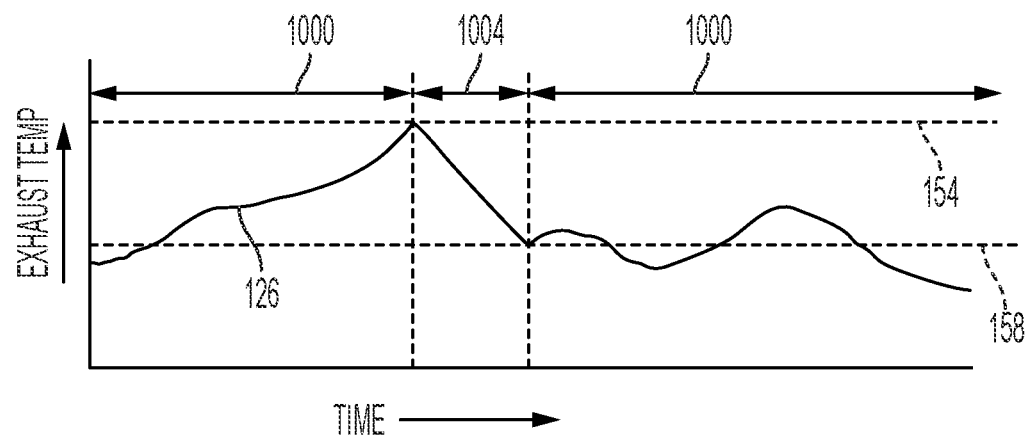

In other implementations, the processor 86 of the controller 26 is configured to monitor the real-time exhaust temperature 126 and adjust the operating conditions of the power unit 10 when the exhaust temperature 126 exceeds a predetermined limit (see FIG. 4). To do so, the processor 86 receives a constant stream of data from the exhaust manifold temperature sensor 106 indicating the real-time exhaust temperature 126. The processor 86 then compares the exhaust temperature 126 to a pre-determined maximum exhaust temperature limit 154. If the detected exhaust temperature 126 is less than the maximum exhaust temperature limit 154 the processor 86 is configured to permit the turbocharger 18 to continue to operate as is (e.g., in the default mode). However, if the detected real-time exhaust temperature 126 is greater than the maximum exhaust temperature 154, a hazard condition exists and the processor 86 is configured to enact a non-derating countermeasure to reduce the exhaust temperature 126.

In the illustrated implementation, the processor 86 enacts a non-derating countermeasure by switching the turbocharger 18 into the power assist configuration. To do so, the processor 86 outputs signals to the motor 46 instructing the motor 46 to change into the drive mode (described above). By doing so, the motor 46 supplements the torque produced by the turbine assembly 42 causing the shaft speed 118 of the shaft 50 to increase and the compressor assembly 38 to output a greater volume of air to the intake manifold 30. This increase in airflow from the compressor assembly 38, in turn, increases the air/fuel ratio 130 within the ICE 14 causing the exhaust temperature 126 to decrease. Depending on the specific control algorithms present, the magnitude of the supplemental torque provided by the motor 46 may be actively adjusted allowing the processor 86 to actively control the shaft speed 118 and the resulting air/fuel ratio 130.

Once the real-time exhaust temperature 126 falls below a pre-determined exhaust temperature activation limit 158, the processor 86 is configured to return the turbocharger 18 to its initial operating condition (e.g., the default configuration, described above). By doing so the motor 46 is returned to the free wheel mode of operation, removing the supplemental torque applied to the shaft 50. In the illustrated implementation, the activation limit 158 is less than the maximum exhaust temperature limit 154 (see FIG. 4); however in alternative implementations, the activation limit 158 and the maximum exhaust temperature limit 154 may be the same.

Figure 5:
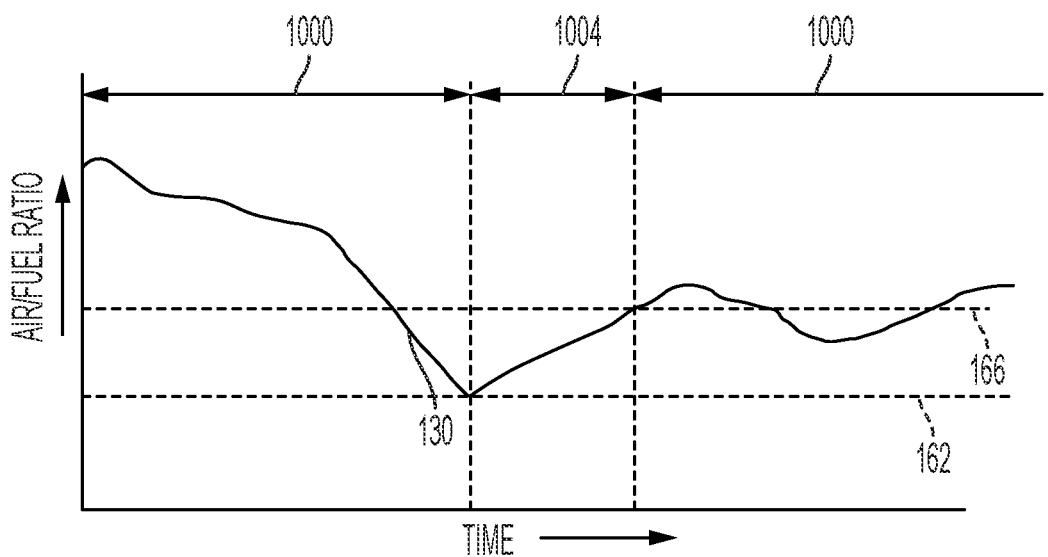

In other implementations, the processor 86 of the controller 26 is configured to monitor the real-time air/fuel ratio 130 and adjust the operating conditions of the power unit 10 when the air/fuel ratio 130 becomes too rich (e.g., the air/fuel ratio 130 becomes too low) and can produce a smoke limited fueling situation (see FIG. 5). To do so, the processor 86 receives a constant stream of data from the air/fuel sensor 110 indicating the real-time air/fuel ratio 130. The processor 86 then compares the air/fuel ratio 130 to a pre-determined minimum air/fuel ratio 162. If the detected air/fuel ratio 130 remains lean enough (e.g., above the minimum air/fuel ratio 162) the processor 86 is configured to permit the turbocharger 18 to continue to operate as is (e.g., in the default mode). However, if the detected real-time air/fuel ratio 130 becomes too rich (e.g., is less than or equal to the minimum air/fuel ratio 130), a hazard condition exists and the processor 86 is configured to enact a non-derating countermeasure to increase the air/fuel ratio 130 within the ICE 14.

In the illustrated implementation, the processor 86 enacts a non-derating countermeasure by switching the turbocharger 18 into the power assist configuration (see FIG. 5). As discussed above, the processor 86 does so by sending signals to the motor 46 instructing the motor 46 to change into the drive mode (described above). By doing so, the motor 46 supplements the torque produced by the turbine assembly 42 causing the shaft speed 118 of the shaft 50 to increase and the compressor assembly 38 to output a greater volume of air to the intake manifold 30. The increase in airflow from the compressor assembly 38, in turn, increases the air/fuel ratio 130 within the ICE 14. Depending on the specific control algorithms present, the magnitude of the supplemental torque provided by the motor 46 may be actively adjusted allowing the processor 86 to actively control the shaft speed 118 and the resulting air/fuel ratio 130.

Once the air/fuel ratio 130 rises above a pre-determined air/fuel activation limit 166, the processor 86 is configured to return the turbocharger 18 to its initial operating condition (e.g., the default configuration, described above). By doing so the motor 46 is returned to the free wheel mode of operation, removing the supplemental torque applied to the shaft 50. In the illustrated implementation, the activation limit 166 is greater than the minimum air/fuel ratio 162 (see FIG. 5); however in alternative implementations, the activation limit 166 and the minimum air/fuel ratio 162 may be the same.

In other implementations, the processor 86 of the controller 26 is configured to monitor the ambient air pressure 170 via the ambient air pressure sensor 116 and adjust the operating conditions of the power unit 10 when the ambient air pressure 170 drops below a predetermined limit. This process can be used to compensate for changes in barometric pressure and/or operating elevation (e.g., the elevation at which the power unit 10 is located). To do so, the processor 86 receives a constant stream of data from the ambient air pressure sensor 116 indicating the real-time ambient air pressure 170. In response to the ambient air readings the processor 86 may place the turbocharger 18 in the power assist configuration to supplement the rotation of the compressor assembly 38 and compensate for the thinner air. In such implementations, the lower the ambient air pressure 170 the greater the supplemental torque provided by the motor 46 to compensate.

In other implementations, the processor 86 of the controller 26 is configured to monitor the operating elevation and adjust the operating conditions of the power unit 10 based at least in part on the detected operating elevation. To do so, the processor 86 receives a constant stream of data from an elevation detection source (e.g., either directly via a GPS unit or indirectly via the ambient air pressure sensor 116) indicating the real-time operating elevation and may place the turbocharger 18 in the power assist configuration to supplement the rotation of the compressor assembly 38 and compensate for the thinner air. In such implementations, the higher the operating elevation the greater the supplemental torque provided by the motor 46 to compensate.

In still other implementations, the processor 86 may also be configured to jointly monitor the operating elevation and the air/fuel ratio 130. In such implementations, the processor 86 may utilize the turbocharger 18 to maintain the air/fuel ratio 130 at a pre-determined level and compensate for higher operating elevations. To do so, the processor 86 receives a constant stream of data from an elevation detection source (e.g., either directly via a GPS unit or indirectly via the ambient air pressure sensor 116) and the current air/fuel ratio 130 and may compensate for the resultant lowering of the air/fuel ratio 130 by placing the turbocharger 18 in the power assist configuration. By doing so, the boost provided by the turbocharger 18 compensates for the thinning air at higher elevations allowing the air/fuel ratio 130 to be maintained at the pre-determined level. By doing so, the turbocharger 18 is able to maintain the air/fuel ratio 130 above a lower threshold at higher operating elevations (e.g., the elevation where the lower threshold is reached is higher). As such, the ICE 14 can operate in more locations and conditions. More specifically, the processor 86 is configured to increase the level of boost output by the turbocharger 18 (e.g., increase the rotational speed of the compressor wheel 66 relative to the compressor housing 62) as the air/fuel ratio 130 drops and/or as the operating elevation increases.

Figure 6:
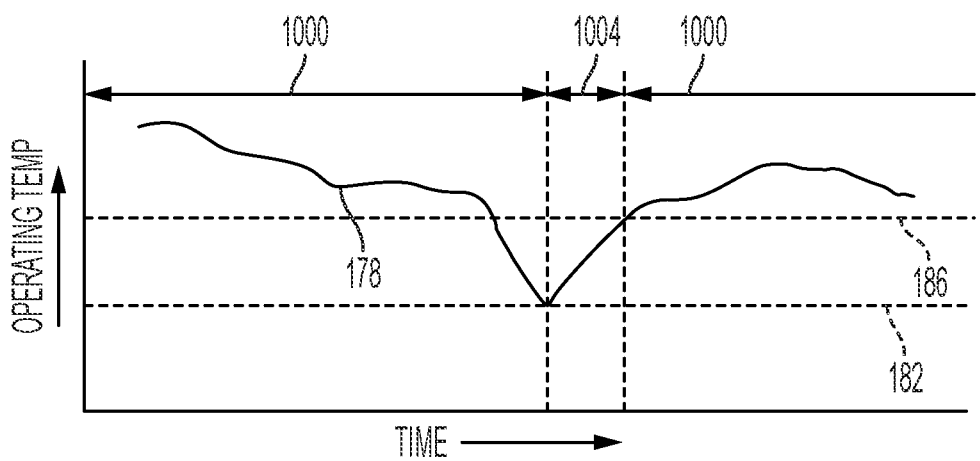

In some implementations, the processor 86 of the controller 26 is configured to monitor the operating temperature 178 of the EATS 82 and adjust the operating conditions of the power unit 10 when the EATS operating temperature 178 drops below the optimized range (see FIG. 6). To do so, the processor 86 receives a constant stream of data from an EATS operating temperature sensor 182 indicating the real-time operating temperature 178 of the EATS 82. The processor 86 then compares the operating temperature 178 to a pre-determined minimum operating temperature 182. If the operating temperature 178 is greater than the minimum operating temperature 186, the processor 86 is configured to permit the turbocharger 18 to continue operating in the default configuration (see FIG. 6). However, if the detected operating temperature is less than or equal to the minimum operating temperature 186, a hazard condition exists and the processor 86 is configured enact a non-derating countermeasure to increase the operating temperature.

In the illustrated implementation, the processor 86 enacts a non-derating countermeasure in response to the low operating temperature by switching the turbocharger 18 into the power harvesting configuration. As described above, the processor 86 does so by sending signals to the motor 46 instructing the motor 46 to change into the generator mode (described above). By doing so, the motor 46 begins to resist the rotation of the shaft 50 thereby reducing the shaft speed 118. This reduction in speed causes the compressor assembly 38 to exhaust less compressed air into the ICE 14, decreasing the air/fuel ratio. The decrease air/fuel ratio, in turn, causes the exhaust temperature to increase. Finally, the increase in exhaust temperature causes a similar increase in the operating temperature of the EATS 82. Depending on the specific control algorithms present, the magnitude of the resisting force exerted by the motor 46 onto the shaft 50 may be actively adjusted by the processor 86. As such, the processor 86 is able to actively adjust the rate at which the shaft 50 decelerates and the operating temperature increases.

Once the real-time operating temperature 178 rises above the minimum activated operating temperature 186, the processor 86 is configured to return the turbocharger 18 to its initial operating conditions (e.g., the default configuration, described above).

Figure 7:
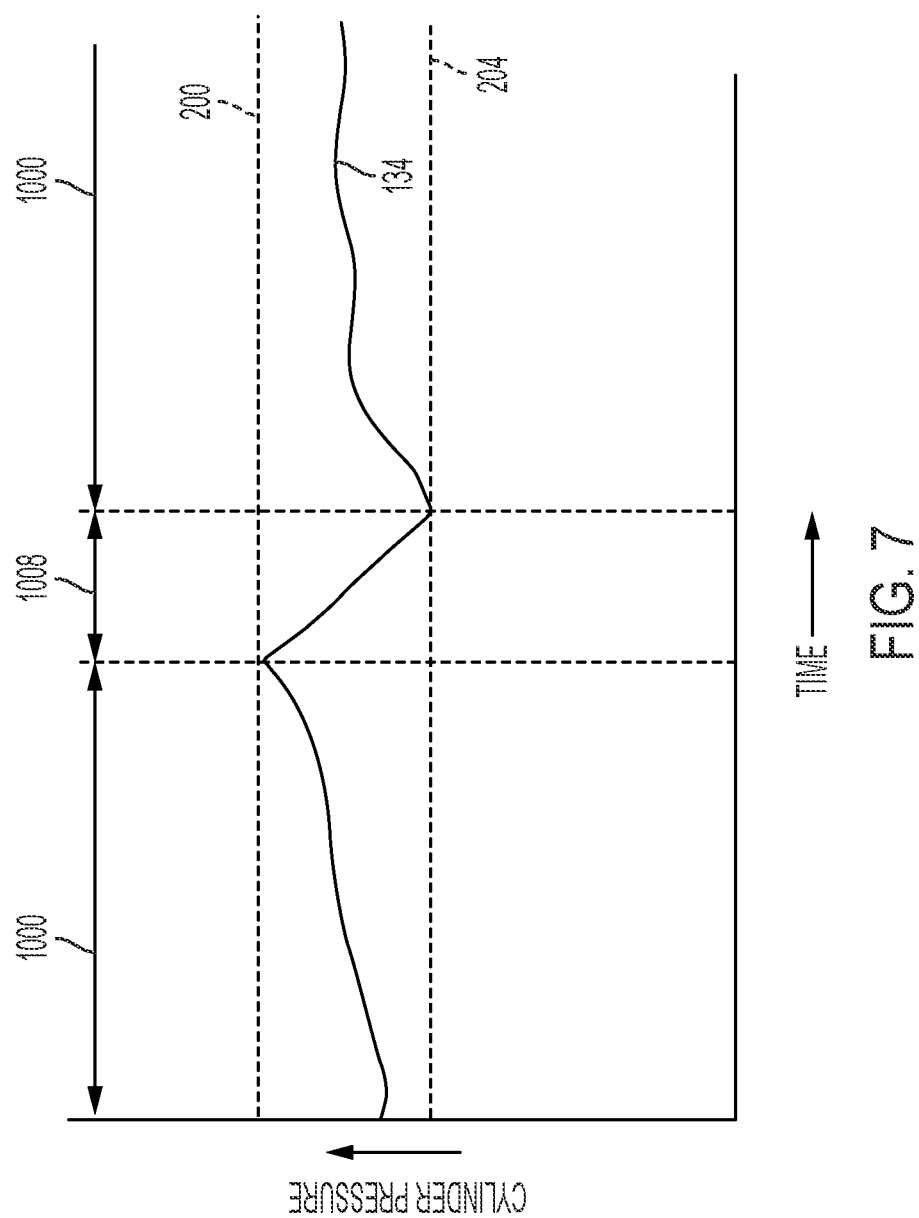

In some implementations, the processor 86 of the controller 26 is configured to monitor the real-time cylinder pressure 134 of the ICE 14 and adjust the operating conditions of the power unit 10 when cylinder pressure 134 exceeds a predetermined limit. To do so, the processor 86 receives a constant stream of data from the cylinder pressure sensor 114 indicating the real-time cylinder pressure 134 of the ICE 14. The processor 86 then compares the real-time cylinder pressure 134 to a pre-determined maximum cylinder pressure 200. If the real-time cylinder pressure 134 is less than the maximum cylinder pressure 200, the processor 86 is configured to permit the turbocharger 18 to continue operating in the default configuration (see FIG. 7). However, if the detected real-time shaft speed 118 is greater than or equal to the maximum rotational limit 138, a hazard condition exists and the processor 86 is configured enact a non-derating countermeasure to reduce the cylinder pressure.

In the illustrated implementation, the processor 86 enacts a non-derating countermeasure in response to the hazard condition by switching the turbocharger 18 into the power harvesting configuration as described above. Once in the generator mode, the motor 46 resists the rotation of the shaft 50 thereby reducing the shaft speed 118 and reducing the volume of air directed into the ICE 14 by the compressor assembly 38. This, in turn, reduces the cylinder pressure 134 within the ICE 14. In the present implementation, the magnitude of the resisting force exerted by the motor 46 onto the shaft 50 may be actively adjusted by the processor 86. As such, the processor 86 is able to actively control cylinder pressure 134.

In addition to reducing the shaft speed 118, the motor 46 also produces electrical energy, as described above. The generated energy, in turn, is directed to the supplemental power unit 22 by the processor 86 causing the supplemental power unit 22 to exert supplemental torque to the crank shaft 36 of the ICE 14 in the first direction A. By reducing the load required by the ICE 14, the cylinder pressures 134 can still further be reduced.

Once the real-time shaft speed 118 falls below a cylinder pressure activate pressure 204, the processor 86 is configured to return the turbocharger 18 to its initial operating conditions (e.g., the default configuration, described above). By doing so the motor 46 is returned to the free wheel mode of operation, removing the resistance from the shaft 50. The supplemental power unit 22 may also stop applying torque to the crank shaft 36 once the power output of the ICE 14 returns to its anticipated level. In the illustrated implementation, the rotation activation limit 142 is less than the maximum rotational limit 138 (see FIG. 2); however in alternative implementations, the rotation activation limit 142 and the maximum rotation limit 138 may be the same.

Figure 8:
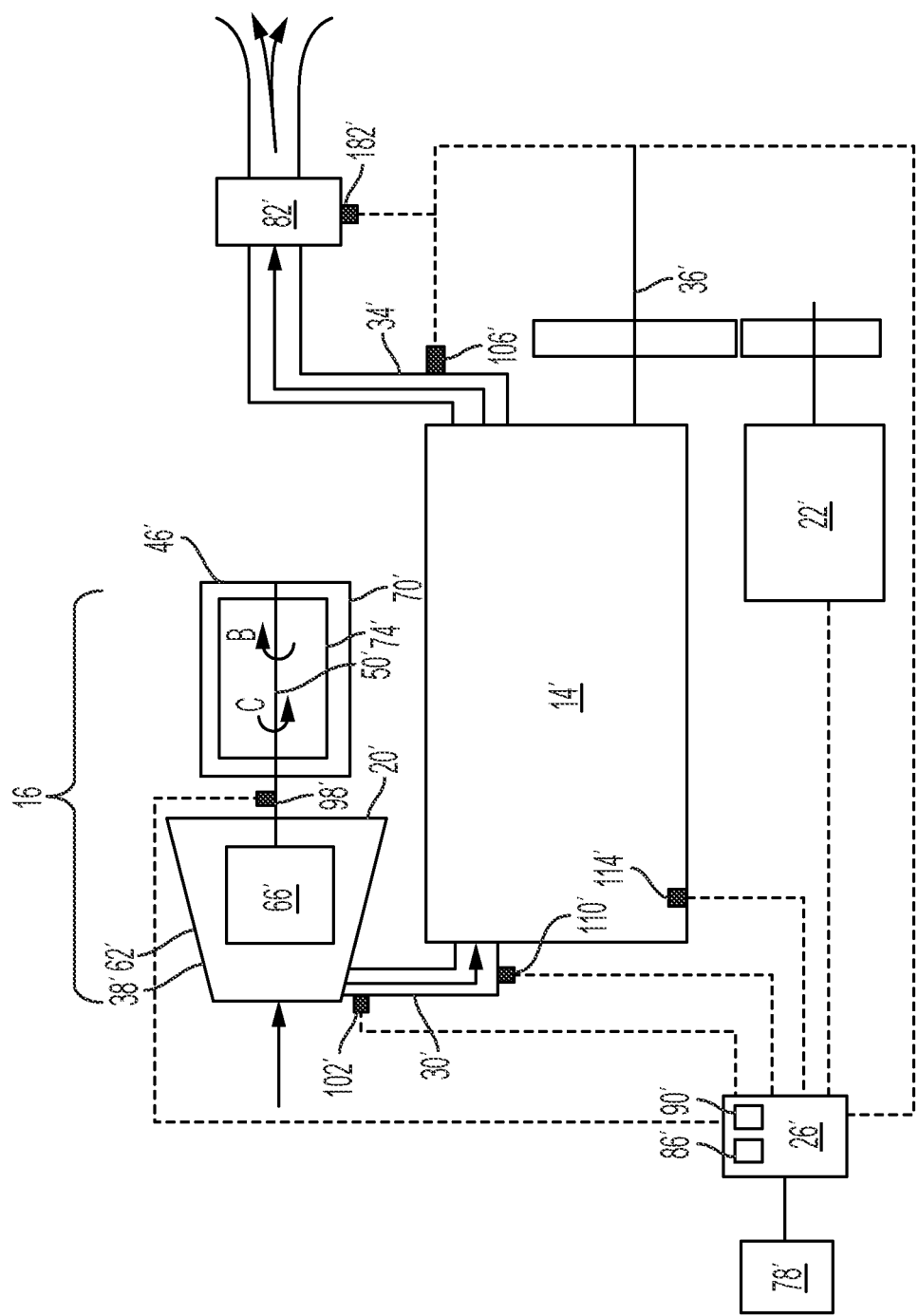
FIG. 8 is a schematic view of another implementation of the power unit of FIG. 1 having an electrified air system including a compressor.

FIG. 8 illustrates another implementation of the power unit 10'. The power unit 10' is substantially similar to the power unit 10 shown in FIG. 1. As such, only the difference will be discussed herein.

The power unit 10' includes an EAS 16' that includes an electrically assisted compressor 20' in operable communication with the intake manifold 30' of the ICE 14'. The compressor 20' includes a compressor assembly 38', a motor-generator unit 46', a shaft 50' in operable communication with the compressor assembly 38' and the motor-generator unit 46'. During use, the controller 26' is configured to send signals to the motor-generator 46' causing it to drive the compressor wheel 66' of the compressor assembly 38' relative to the compressor housing 62' via the shaft 50'. The rotation, in turn, causes the compressor assembly 38' to direct air into the intake manifold 30' of the ICE 14'.

The controller 26' of the power unit 10' is configured to operate the compressor 20' in much the same way the controller 26' operates the turbocharger 18, described above. More specifically, the controller 26' is configured to operate the compressor 20' to overcome hazard conditions generally corresponding to high exhaust manifold temperatures, low air/fuel ratios, and ambient air compensation as described above.

FIGS. 9-13 illustrate another implementation of the EAS 16". The EAS 16" is substantially similar to the EAS 16' shown in FIG. 8. As such, only the differences will be discussed herein. The EAS 16" includes a compressor assembly 300" in operable communication with the intake manifold 30, a motor 304", and a bypass valve assembly 308".

Figure 11:
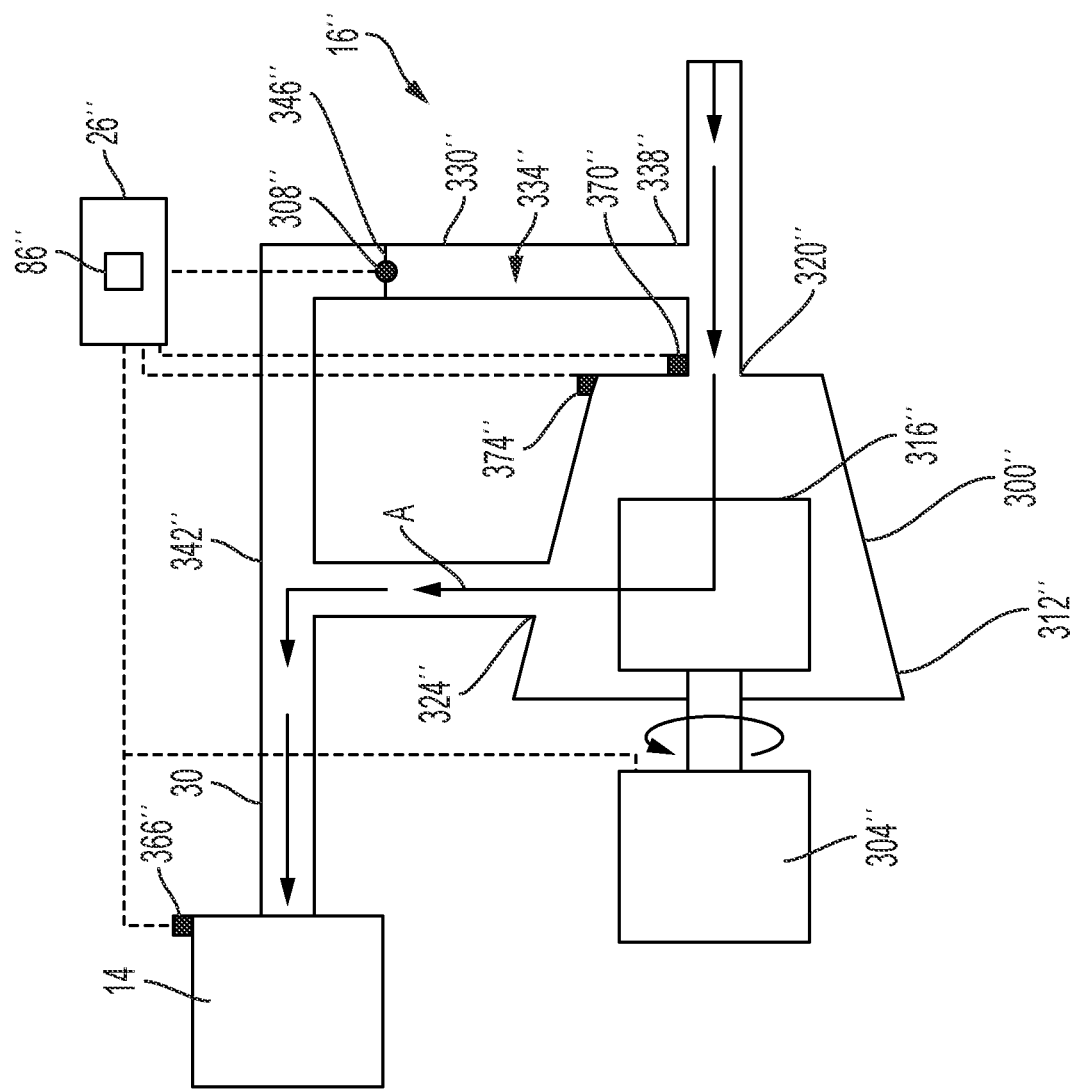
FIG. 11 is a schematic view of the electrified air system of FIG. 9 in the boosted mode.

The compressor assembly 300" of the EAS 16' includes a compressor housing 312" with an inlet 320" and an outlet 324", and a compressor wheel 316" positioned within and rotatable with respect to the compressor housing 312". The compressor wheel 316" is mounted to and supported by the motor 46" such that activating the electric motor 46" (e.g., causing the motor 46" to rotate) causes the compressor wheel 316" to rotate relative to the compressor housing 312". As shown in FIG. 11, the outlet 324" of the compressor housing 312" is open to and in fluid communication with the intake manifold 30.

During operation, the compressor assembly 300" is operable in a driven mode and a non-driven mode. In the driven mode, the motor 304" is activated by the controller 26" causing the motor 304" to rotate the compressor wheel 316" relative to the compressor housing 312". By rotating the compressor wheel 316", the compressor assembly 300" draws air into the compressor housing 312" through the inlet 320", compresses the air, and exhausts the resulting compressed air via the outlet 324". At a fixed engine speed, the flow rate and pressure at which air is exhausted from the outlet 324" is generally proportional to the speed at which the compressor wheel 316" is rotating relative to the compressor housing 312", and therefore, the speed at which the electric motor 46" is driven. As such, the faster the controller 26" instructs the compressor wheel 316" to rotate during the driven mode, the greater the air flow and air pressure directed into the intake manifold 30. In the non-driven mode, the motor 304" is not activated by the controller 26" and therefore the compressor wheel 316" is not actively driven relative to the compressor housing 312". In the non-driven mode, no air is actively drawn into the inlet 320", compressed, or exhausted through the outlet 324".

The bypass valve assembly 308" of the EAS 16" includes a body 330" at least partially defining a bypass or passageway 334" therethrough. The passageway 334", in turn, includes a first end 338" open to and in fluid communication with the inlet 320" of the compressor assembly 300", and a second end 342" open to and in fluid communication with the outlet 324" of the compressor assembly 300". The valve assembly 308" also includes a valve 346" at least partially positioned within the passageway 334" of the body 330' and configured to influence the flow of gasses through the passageway 334". The valve assembly 308" is adjustable between an open configuration (see FIG. 10), in which the first end 338" is in fluid communication with the second end 342" via the passageway 334", and a closed configuration (see FIG. 9), in which the first end 338" is not in fluid communication with the second end 342" via the passageway 334". As shown in FIG. 11, the first end 338" of the passageway 334" is also open to and in fluid communication with the intake manifold 30 of the ICE 14.

In the illustrated implementation, the valve 346" of the valve assembly 308" includes a pair of gate members 350a", 350b", each of which are pivotable relative to the body 330" between a closed position, in which each gate member 350a", 350b" is oriented substantially perpendicular to the passageway 334" and forms a seal with the sidewall 354" of the passageway 334", and an open position, in which the gate members 350a", 350b" are not perpendicular to the passageway 334" (e.g., angled toward the second end 342") such that the gate members 350a", 350b" do not form a seal with the sidewall 354" and allow the flow of gasses through the passageway 334".

The valve 346" also includes a biasing member 358" (e.g., a spring) configured to bias each of the gate members 350a", 350b" toward the closed position. More specifically, the biasing member 358" is configured to output a pre-determined level of biasing force such that the gate members 350a", 350b" will pivot from the closed position toward the open position when a predetermined pressure differential exists across the valve 346".

Figure 9:
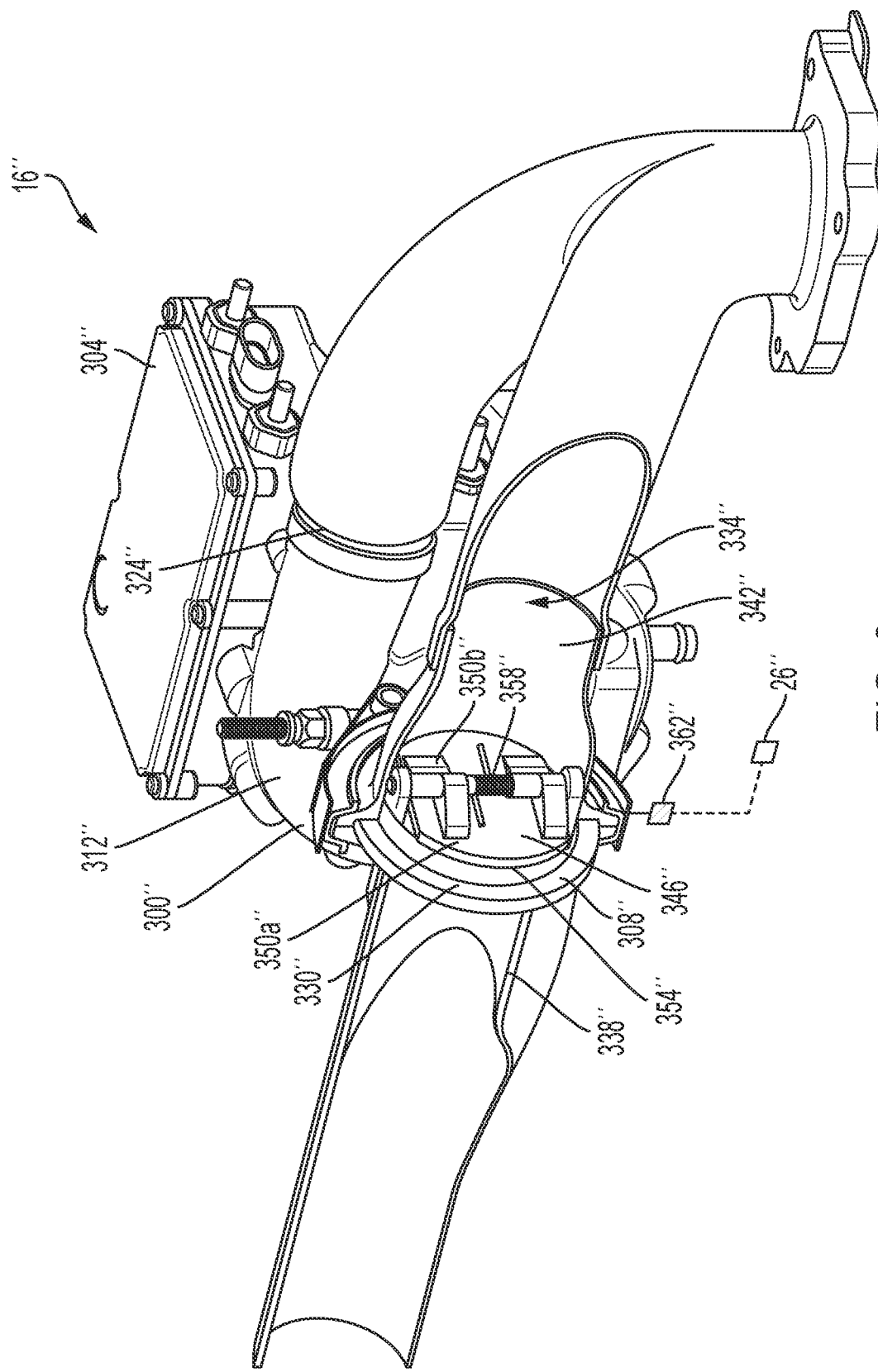
FIG. 9 illustrates another implementation of the electrified air system with the valve in the closed configuration.
Figure 10:
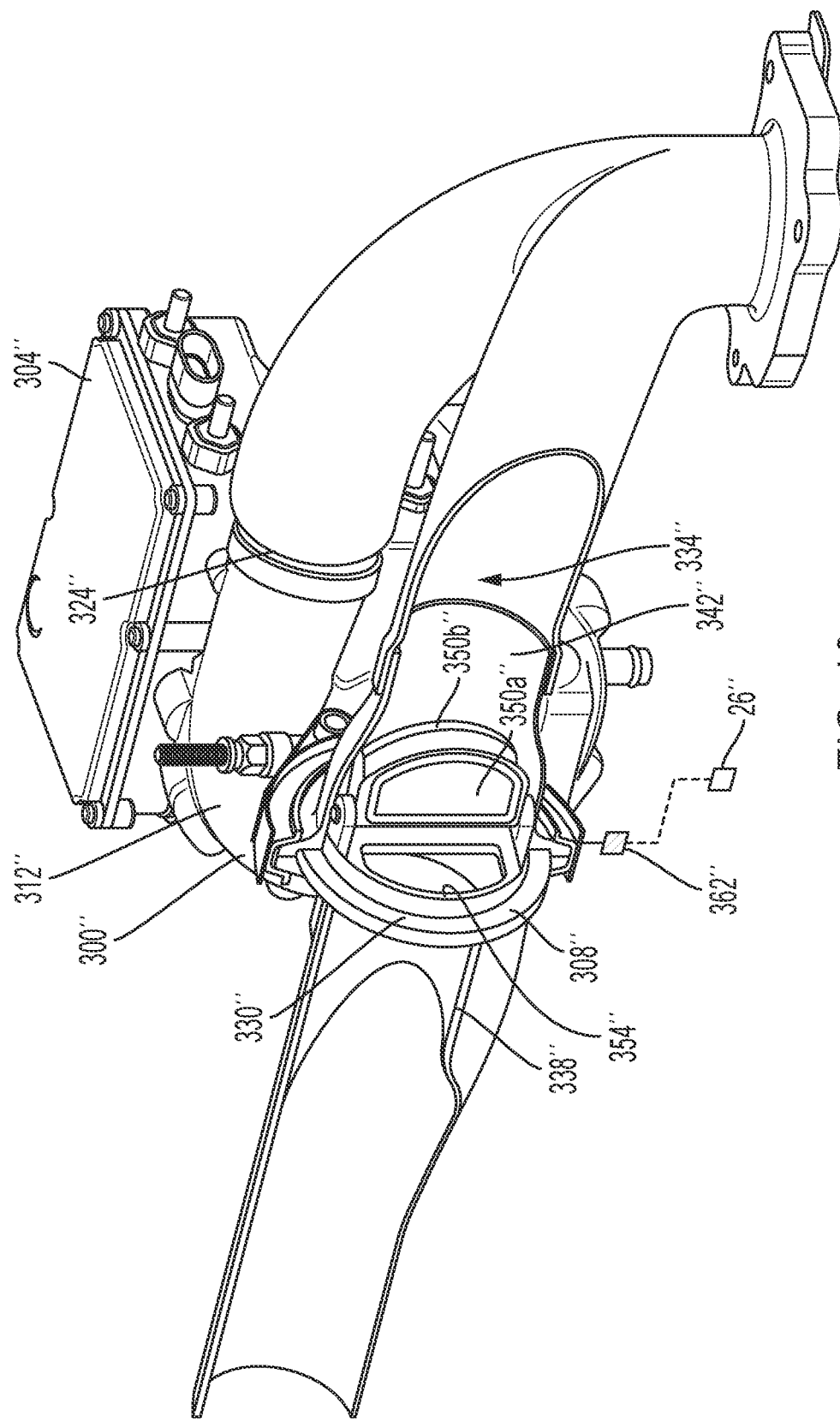
FIG. 10 illustrates the electrified air system of FIG. 9 with the valve in the open configuration.

The valve assembly 308" also includes an actuator 362" in operable communication with the valve 346" and configured to selectively move the valve 346" between the open configuration and the closed configuration. More specifically the actuator 362" actively pivots each of the individual gate members 350a", 350b" within the passageway 334" between the open and closed positions. As shown in FIGS. 9 and 10, the actuator 362" is in operable communication with and actively controlled by the controller 26" such that the controller 26" outputs signals to the actuator 362" causing the valve 346" to move between the open position and the closed position.

Figure 12:
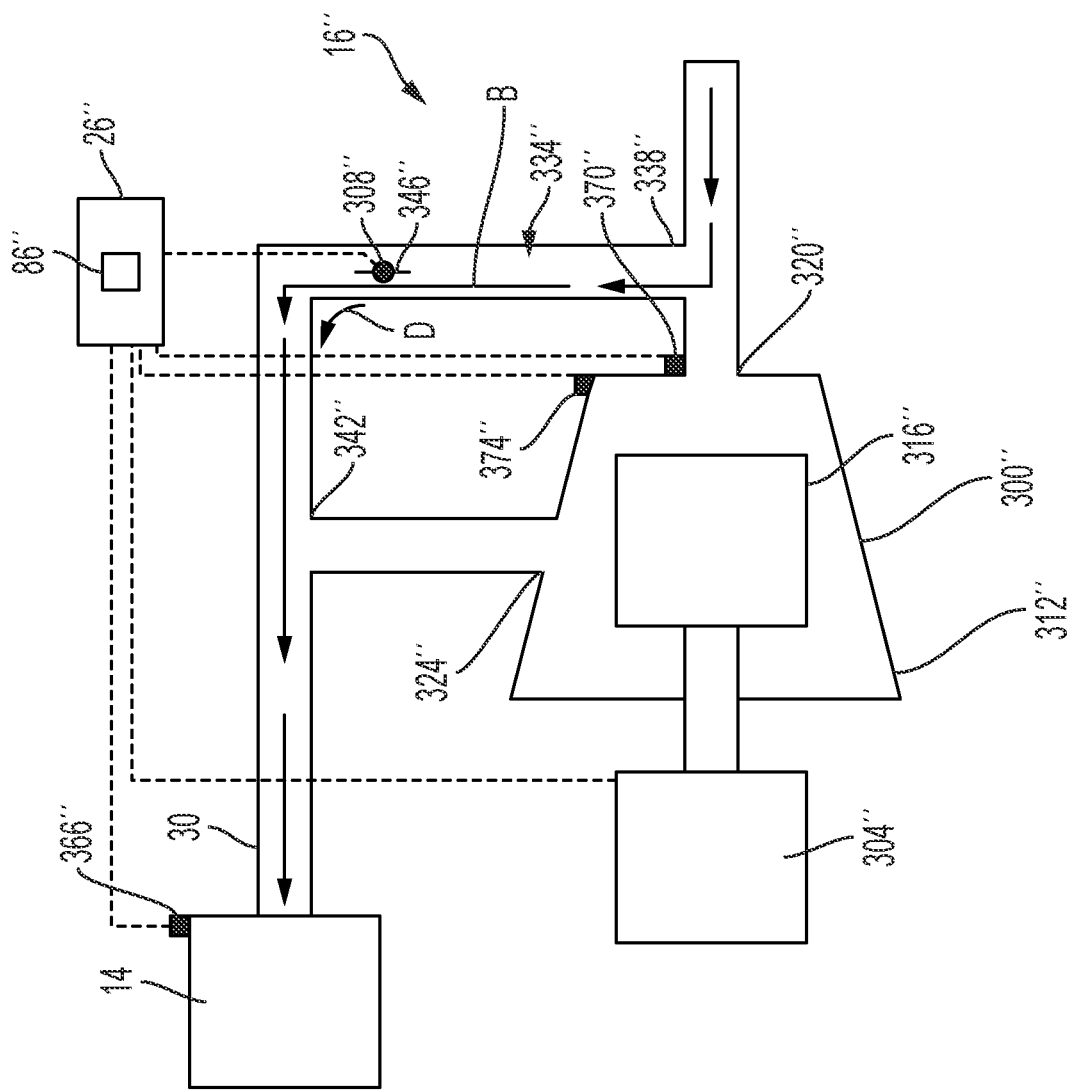
FIG. 12 is a schematic view of the electrified air system of FIG. 9 in the non-boosted mode.
Figure 13:
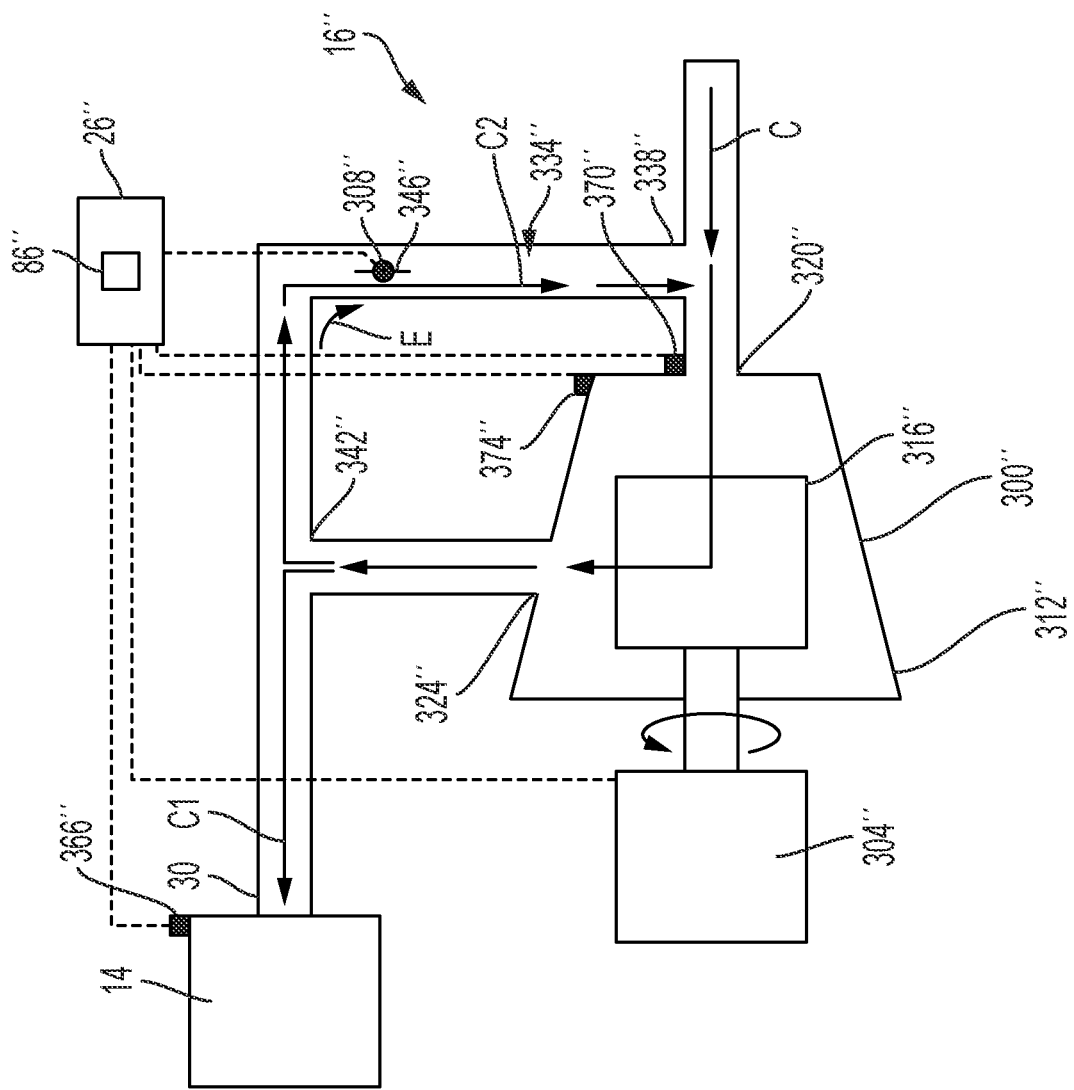
FIG. 13 is a schematic view of the electrified air system of FIG. 9 in the recirculating mode.

During operation, the EAS 16" is operable in a boosted mode (see FIG. 11), a non-boosted mode (see FIG. 12), and a recirculation mode (see FIG. 13). When operating in the boosted mode, the actuator 362" places the valve assembly 308" in the closed configuration (e.g., by pivoting the gate members 350a", 350b" into the closed position) while the compressor assembly 300" operates in the driven configuration. By doing so, the entire volume of air entering the EAS 16" flows along a first flowpath A and is directed into the inlet 320" of the compressor assembly 300". After entering the compressor assembly 300", the air is compressed and exhausted through the outlet 324" into the intake manifold 30 for subsequent use by the ICE 14 (described above). The boosted mode allows the controller 26" to boost or supplement the flow of air into the ICE 14 using the EAS 16" by controlling the speed at which the compressor wheel 316" is rotated relative to the compressor housing 312" (e.g., via the motor 304").

When operating in the non-boosted mode the actuator 362" places the valve assembly 308" in the open configuration (e.g., by pivoting the gate members 350a", 350b" into the open position) while the compressor assembly 300" operates in the non-driven mode. By doing so, the entire volume of air entering the EAS 16" flows along a second flowpath B where it flows through the passageway 334" in a first direction D (e.g., from the first end 338" toward the second end 342") and into the intake manifold 30, bypassing the compressor assembly 300". This configuration is used when no supplemental boost is needed by the ICE 14 and the airflow entering the EAS 16" is sufficient for ICE 14 operations.

When operating in the bypass mode the actuator 362" places the valve assembly 308" in the open configuration (e.g., pivots the gate members 350a", 350b" into the open position) while the compressor assembly 300" operates in the driven mode. By doing so, a recirculating flow is created whereby air entering the EAS 16" (airflow C) is directed into the inlet 320" of the compressor 300". The airflow C is then compressed, as described above, and increases in temperature. The compressed and heated air is then exhausted through the outlet 324" where the airflow is split into two portions. A first flow portion C1 flows into the ICE 14 via the intake manifold 30 while a second flow portion C2 recirculates through the passageway 334" in a second direction E opposite the first direction D (e.g., from the second end 342" toward the first end 338" and from the outlet 324" toward the inlet 320") and back toward the inlet 320" of the compressor 300". The second flow portion C2 then merges with fresh air entering the EAS 16" (e.g., airflow C). The combined flow, now pre-heated from the energy contained in the second portion C2, is directed into the inlet 320" of the compressor assembly 300" where the combined flow is compressed and heated even further. This heating capability helps elevate the operating temperature in the power unit 10 to overcome cold-start conditions.

Furthermore, by allowing a portion of the airflow to recirculate through the compressor 300" (e.g., first flow portion C2), the EAS 16" can avoid compressor surge conditions within the compressor 300". More specifically, by providing a passageway 334" for air to flow aside from into the ICE 14, the volumetric flow rate through the compressor 300" (e.g., the compressor flow rate) can be larger than the volumetric flow rate into the ICE 14 (e.g., the ICE flow rate) while maintaining a closed intake system.

Illustrated in FIGS. 11-13, the processor 86" of the controller 26" is configured to operate as described above regarding the detection of and response to potentially damaging attributes without causing de-rates in the ICE 14. Furthermore, the processor 86" is configured to receive signals from the one or more sensors, input the received information into one or more predetermined control algorithms to determine when a "cold-start" condition exists, and output signals to the EAS 16" to address the cold-start condition. More specifically, the processor 86" is configured to output signals to the EAS 16" placing it in the recirculation mode whereby recirculating at least a portion of the intake airflow through the compressor assembly 300" pre-heats the intake airflow before entering the ICE 14. The recirculating airflow also allows the compressor assembly 300" to avoid potential surge conditions by permitting a portion of the volume of air flowing through the EAS 16" to recirculate through the compressor assembly 300". By doing so, the compressor flow rate can be larger than the ICE flow rate during operation. After the cold-start or hazard condition is detected, the controller 26" is configured to return the EAS 16" and/or ICE 14 to its normal operating conditions.

The controller 26" of the power unit 10' includes an engine temperature sensor 366" configured to output a signal corresponding to the ICE 14 operating temperature. More specifically, the engine temperature sensor 366" is generally associated with the water temperature of the ICE 14, however in alternative implementations other temperatures associated with the ICE 14 may be used.

The controller 26' of the power unit 10' also includes an inlet pressure sensor 370" configured to output a signal corresponding to the gas pressure level at the inlet 320" of the compressor assembly 300".

The controller 26' of the power unit 10' also includes a compressor flow sensor 374" configured to output a signal corresponding to the volumetric flow rate of gasses through the compressor housing 312".

While, in the illustrated implementation, each of the above sensors 366", 370", 374" are physical sensors, in alternative implementations each of the sensors associated with the power unit 10' may be virtual in nature and be modeled based on algorithmic calculations and alternative data types.

In some implementations, the processor 86' is configured to monitor the real-time ICE 14 operating temperature (e.g., as output by the engine temperature sensor 366") and adjust the operating conditions of the EAS 16" when the operating temperature is below a predetermined limit. To do so, the processor 86" receives a constant stream of data from the engine temperature sensor 366" indicating the real-time engine operating temperature. The processor 86" then compares the real-time engine operating temperature with a pre-determined minimum engine operating temperature limit. If the detected real-time temperature is greater than the pre-determined minimum temperature the processor 86" is configured to permit the EAS 16" to continue to operate as is (e.g., in either the boosted or non-boosted modes). However, if the detected real-time engine operating temperature is less than the minimum engine operating temperature, a cold-start condition exists and the processor 86" is configured to place the EAS 16" in the recirculating mode. As described above, by placing the EAS 16" in the recirculating mode the EAS 16" is able to increase the heat within the power unit 10 more rapidly and increase the engine operating temperature beyond the minimum threshold required for normal starting conditions.

In other implementations, the processor 86" is configured to monitor the real-time inlet air pressure at the compressor 300" and adjust the operating conditions of the power unit 10 when the inlet air pressure exceeds a predetermined limit. To do so, the processor 86" receives a constant stream of data from the inlet pressure sensor 370" indicating the real-time inlet air pressure at the compressor 300". The processor 86" then compares the real-time inlet pressure to a pre-determined maximum inlet pressure limit. If the detected real-time inlet pressure exceeds the maximum limit, a cold-start or hazard condition exists and the processor 86" is configured to place the EAS 16" in the recirculating mode.

In still other implementations, the processor 86" is configured to monitor the real-time compressor flow rate and adjust operating conditions of the power unit 10 when the compressor flow rate drops below a predetermined minimum limit. To do so, the processor 86" receives a constant stream of data from the compressor flow sensor 374" indicating the real-time compressor flow rate. The processor 86" then compares the real-time compressor flow rate to the pre-determined minimum compressor flow rate. If the detected real-time compressor flow rate drops below the pre-determined minimum, a cold-start or hazard condition exists and the processor 86" is configured to place the EAS 16" in the recirculating mode.

In still other implementations, the processor 86" is configured to monitor the compressor pressure/airflow ratio (e.g., defined as the compressor flow rate divided by the compressor inlet pressure) and adjust the operating conditions of the power unit 10 when the pressure/airflow ratio is outside the desired range. To do so, the processor 86" receives a constant stream of data from the compressor flow sensor 374" and the inlet pressure sensor 370". The processor 86" then calculates the pressure/airflow ratio using the collected data and inputs the resulting pressure/airflow ratio into a compressor data map. If the results fall within a pre-determined operating envelope, the processor 86" allows the EAS 16" to continue operating as is. However, if the results from the compressor data map fall outside the pre-determined operating envelope (e.g., are "off the map") the processor 86" is configured to place the EAS 16" in the recirculating mode.

In still other implementations, the processor 86" is configured to monitor the operation of the starter motor 40 (see FIG. 1) and adjust the operating conditions of the EAS 16" based at least in part on whether the starter motor 40 is operating. To do so, the processor 86" is in operable communication with the starter motor 40 and receives a signal when the starter motor 40 is being operated (e.g., actively rotating the crank shaft 36). When such a signal is present, the processor 86" may adjust the EAS 16" into the recirculation mode.

The invention claimed is:

1. An intake system for use with an internal combustion engine having one or more cylinders, the intake system comprising:
   a compressor assembly having an inlet and an outlet, and wherein the outlet is configured to be open to and in fluid communication with at least one of the one or more cylinders;
   a passageway extending between and in fluid communication with the inlet and the outlet and configured to direct a first flow of gasses; and
   a controller in operable communication with the compressor assembly, wherein the intake system is operable in a first mode in which the majority of gasses of the first flow of gasses flow through the passageway toward the outlet, and a second mode in which the majority of gasses of the first flow of gasses flow through the passageway toward the inlet.

2. The intake system of claim 1, further comprising a valve in operable communication with the passageway and the controller, wherein the valve is adjustable between an open configuration in which the first flow of gasses may flow through the passageway, and a closed configuration in which the first flow of gasses cannot flow through the passageway.

3. The intake system of claim 2, wherein the valve is in the open configuration during the first mode and the second mode.

4. The intake system of claim 2, wherein the intake system is operable in a third mode in which the valve is in a closed configuration.

5. The intake system of claim 1, wherein the compressor assembly is adjustable between an activated configuration and a deactivated configuration, and wherein the compressor assembly is in the activated configuration during the second mode.

6. The intake system of claim 5, wherein the compressor assembly is in the deactivated configuration during the first mode.

7. The intake system of claim 5, wherein the internal combustion engine includes a starter motor, and wherein the starter motor is activated during the second mode.

8. The intake system of claim 4, wherein the compressor assembly is adjustable between an activated configuration and a deactivated configuration, and wherein the compressor assembly is in the activated configuration during the third mode.

9. An intake system for use with an internal combustion engine having one or more cylinders, the intake system comprising:
   a compressor assembly having an inlet and an outlet, and wherein the outlet is configured to be in fluid communication with at least one of the one or more cylinders, wherein the compressor is adjustable between an activated configuration and a deactivated configuration; and a passageway extending between and in fluid communication with the inlet and the outlet, the passageway having a first end proximate the inlet and a second end proximate the outlet;

a valve in operable communication with the passageway, wherein the valve is adjustable between an open configuration in which gasses may flow through the passageway, and a closed configuration in which gasses cannot flow through the passageway, and wherein the valve includes a biasing member configured to bias the valve into the closed configuration, wherein the biasing member is configured to allow the valve to change from the closed configuration to the open configuration when a predetermined pressure differential exists across the valve; and a controller in operable communication with the compressor assembly and the valve, wherein the intake system is operable in a boosted configuration, in which the first flow of gasses is directed to the at least one of the one or more cylinders of the internal combustion engine, a non-boosted configuration, in which the compressor assembly is in the deactivated configuration, and a recirculation configuration, in which the first flow of gasses is directed toward the at least one of the one or more cylinders of the internal combustion engine and to the inlet of the compressor assembly.

10. The intake system of claim 9, wherein the controller is configured to detect when a cold-start condition exists, and wherein the controller outputs signals to place the intake system in the recirculation configuration in response to the detection of the cold-start condition.

11. The intake system of claim 9, wherein the valve is in the closed configuration in response to the intake system being in a boosted configuration.

12. The intake system of claim 9, wherein the passageway has a second flow of gasses flowing therethrough, and wherein the second flow of gasses is directed toward the at least one of the one or more cylinders of the internal combustion engine in response to the intake system being in the non-boosted configuration.

13. The intake system of claim 12, wherein the second flow of gasses is directed toward the inlet of the compressor assembly in response to the intake system being in the recirculating configuration.

14. An intake system for use with an internal combustion engine having one or more cylinders, the intake system comprising:

a compressor assembly having an inlet and an outlet, and wherein the outlet is configured to be in fluid communication with at least one of the one or more cylinders, wherein the compressor is adjustable between an activated configuration and a deactivated configuration;

a passageway extending between and in fluid communication with the inlet and the outlet, the passageway having a first end proximate the inlet and a second end proximate the outlet; and a valve in operable communication with the passageway, wherein the valve is adjustable between an open configuration in which gasses may flow through the passageway, and a closed configuration in which gasses cannot flow through the passageway, wherein the valve is configured to adjust from the closed configuration to the open configuration in response to a pressure differential across the valve exceeding a predetermine minimum value, and wherein the valve is configured to adjust from the closed configuration to the closed configuration in response to the pressure at the first end exceeding the pressure at the second end by a predetermined amount.

15. The intake system of claim 14, further comprising an actuator in operable communication with the valve and a controller in operable communication with the actuator, and wherein the actuator is configured to adjust the valve between the open configuration and the closed configuration independent of the pressure differential across the valve.

\* \* \* \* \*